United States Patent

[11] 3,573,758

[72] Inventors Robert A. Henle
Hyde Park;
W. David Pricer, Poughkeepsie, N.Y.

[21] Appl. No. 802,927
[22] Filed Feb. 27, 1969
[45] Patented Apr. 6, 1971
[73] Assignee International Business Machines Corporation
Armonk, N.Y.

[54] NON-LINEAR IMPEDANCE MEANS FOR TRANSISTORS CONNECTED TO EACH OTHER AND TO A COMMON POWER SOURCE
36 Claims, 7 Drawing Figs.

[52] U.S. Cl. .......... 340/173, 307/238, 307/279
[51] Int. Cl. .......... G11c 11/40, H03k 3/286
[50] Field of Search .......... 340/173 (State), 173 (FF); 307/238, 279.

[56] References Cited
UNITED STATES PATENTS
3,363,115 1/1968 Stephenson et al. .......... 340/173

*Primary Examiner*—Terrell W. Fears
*Attorneys*—Hanifin and Jancin and Frank C. Leach, Jr.

ABSTRACT: Each of the pair of transistors of a flip-flop storage cell has its collector connected through a nonlinear impedance means to a low constant current source when the cell is in an inactive condition. The nonlinear impedance means for the conducting transistor maintains the ratio of the load impedance means to the base-emitter impedance of the conducting transistor greater than one to maintain the transistors of the cell in the desired bistable state when the transistors are connected to the low constant current source through the nonlinear impedance means.

Figures 1, 6:
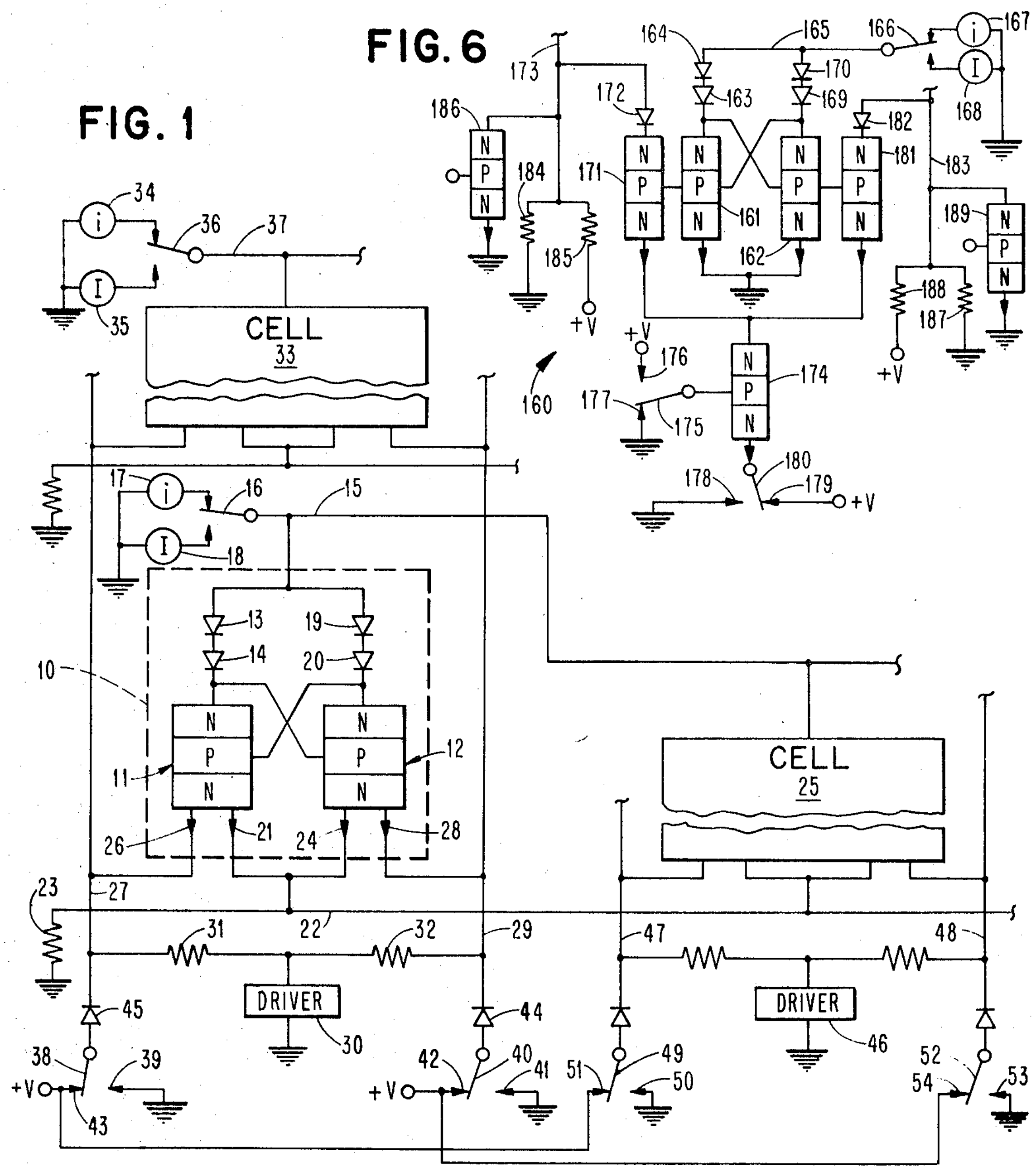

INVENTORS
ROBERT A. HENLE
W. DAVID PRICER
BY Frank C. Leach Jr.
ATTORNEY

NON-LINEAR IMPEDANCE MEANS FOR TRANSISTORS CONNECTED TO EACH OTHER AND TO A COMMON POWER SOURCE

Because of the heat dissipation problem in memory devices of the monolithic type, it is necessary to reduce the average power dissipation of each flip-flop storage cell as low as possible. This decrease in power will reduce the heat dissipation problem.

It has previously been suggested to utilize bilevel powering of monolithic memory storage cells. This reduces the average power dissipation of each storage cell since the high power level is only employed for a relatively short period of time in comparison with the low power level. However, it has been necessary to maintain the current during the low power level at a relatively high level to insure that the storage cell remains in its selected bistable state. That is, this current has been required to maintain the conducting transistor in its conducting state.

Therefore, bilevel powering of monolithic storage cells has reduced the average power dissipation of each storage cell. However, the average power dissipation can be lowered even more if the current from the constant current source during the low power level can be reduced without the storage cell losing its selected bistable state.

To maintain the storage cell in its selected bistable state, it is necessary for the conducting transistor to have the ratio of its load impedance to its base-emitter impedance greater than one. The voltage gain, which is produced by this ratio, is necessary to insure that the conducting transistor remains conducting and that the nonconducting transistor of the cell does not become conducting.

For a bipolar transistor formed in silicon, the impedance of the base-emitter of the transistor is equal to the quotient of 26 divided by the emitter current in milliamps. Since the base current is relatively small in comparison with the collector current, the emitter current may be considered to be the collector current.

Accordingly, as the collector current is decreased to obtain lower power dissipation, the impedance of the base-emitter impedance increases. If the load impedance is a constant, the value at which the voltage gain becomes less than one eventually occurs due to the base-emitter impedance increasing as the collector current decreases whereby the storage cell ceases to remain bistable so that both transistors are conducting simultaneously or ceases to remain in its selected bistable state due to the conducting transistor becoming nonconducting.

While increasing the load impedance would appear to compensate for any decrease in the collector current whereby the voltage gain could be maintained greater than one, area considerations in a monolithic integrated semiconductor array limit the resistance of the collector load impedance to a few thousand ohms at a maximum. Any increase beyond this would require a very long and narrow resistor due to the relationship between resistance, resistivity of semiconductor material, and the area and length of the resistor. Thus, increasing the resistance sufficiently to obtain a relatively low current during low level powering of the storage cell is not feasible.

Furthermore, even if the area of the resistance were not a problem such as when the flip-flop cell is utilized in a nonmonolithic memory, for example, the magnitude of the resistance of the collector load impedance still may not be increased infinitely. This is because an increase in the resistance of the collector load impedance reduces the switching speed of the transistor during its high power level. Therefore, the resistance of the collector load impedance also is limited by the desired switching characteristics of the storage cell.

The present invention satisfactorily solves the foregoing problem by employing a nonlinear impedance means in the load impedance means for each of the pair of transistors of each storage cell. By increasing the resistance of the nonlinear load impedance means as the current flowing through the nonlinear impedance means to the transistor decreases, the voltage gain or ratio between the load impedance means and the base-emitter impedance means is maintained greater than one to insure that the storage cell remains in its selected bistable state. However, this does not affect the switching speed of the cell since the resistance of the nonlinear load impedance means decreases substantially as the current increases during the high power level.

Accordingly, by properly selecting the nonlinear impedance means, the current from the constant current source during the low power level may be reduced substantially. As a result, the average power dissipation of a monolithic memory storage cell is substantially reduced by the present invention.

The present invention uses a pair of diodes in series as the preferred nonlinear impedance means. Thus, as the current through the load impedance decreases, the impedance of the diodes increases nonlinearly. This insures that the ratio of the load impedance means to the impedance of the base-emitter of the transistor remains greater than one.

Since the base-emitter impedance is a diode, the impedance of each of the diodes matches that of the base-emitter diode since they are formed in the same semiconductor substrate. Therefore, the use of two of the diodes insures that the ratio of the load impedance to the ratio of the base-emitter impedance of the transistor always is at least two.

If desired, the nonlinear impedance means may be utilized only when the transistors are connected to a low constant current source. It is not a requisite for the nonlinear impedance means to be employed during the high power level operation of the storage cell.

However, by using the diodes during the high power level as well as during the low power level, a circuit arrangement may be provided whereby the total power consumption by the memory device, which comprises a plurality of storage cells, during the high power level is substantially less than when the high power is connected to each cell. Thus, each of the cells could be connected by a first line to a positive voltage source or ground and by a second line to a low constant current source or a high constant current source. By appropriately arranging the lines, only the selected storage cell of the memory device would have full power thereon since only its first line is connected to ground and its second line to the high constant current. With all of the other lines only connected to either ground or the high constant current source, all of the other storage cells would have substantially less than half power even though subjected to either the higher voltage created by the line connected to ground or to the high constant current source. This is because of the nonlinear increase in the impedance of the diodes.

Instead of utilizing two diodes, the present invention also contemplates utilization of a single diode with a resistor. This permits decreasing the current to a range of 10 to 50 microamps without causing the cell to lose its bistability whereas the cell would become inoperative with a linear impedance when the current decreased much below 100 microamps. Thus, even when utilizing a single diode, the power dissipation in each storage cell of a monolithic memory may be substantially reduced. Of course, the two diodes permit the current to be decreased to as low as 10 picoamps.

An object of this invention is to maintain transistors connected to each other and to a common power source in their desired conducting and nonconducting states at a low power level.

Another object of this invention is to provide a flip-flop storage cell that will retain its bistable state at a relatively low current.

Still another object of this invention is to provide a flip-flop storage cell having reduced power consumption.

A further object of this invention is to reduce the power consumption of a bilevel powered memory device during its operating or active condition.

The foregoing and other objects, features, and advantages of the invention will be more apparent from the following more particular description of the preferred embodiments of the invention as illustrated in the accompanying drawings.

In the drawings:

FIGS. 1—6 are schematic circuit diagrams illustrating various memory devices utilizing the nonlinear impedance means of the present invention.

Figure 7:
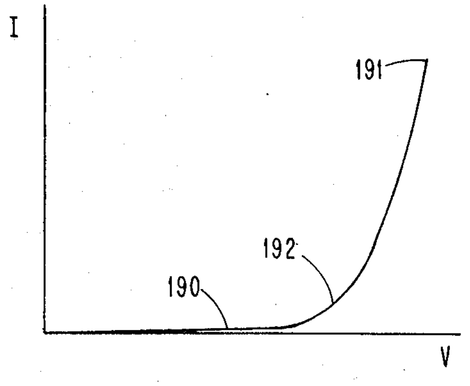

FIG. 7 is a plot of two curves illustrating the relationship of voltage and current of a storage cell with the nonlinear impedance means of the present invention.

Referring to the drawings and particularly FIG. 1, there is shown a flip-flop storage cell 10 including a pair of NPN transistors 11 and 12. Each of the transistors 11 and 12 has its base connected to the collector of the other transistor.

The collector of the transistor 10 is connected through a pair of series connected diodes 13 and 14 to a conductor 15. The conductor 15 is connected through a switch 16, which may be a transistor, for example, to a low constant current source 17 for operation at a low power level operation and a high constant current source 18 for operation at a high power level. The collector of the transistor 12 also is connected to the conductor 15 by a pair of series connected diodes 19 and 20.

By utilizing the diodes 13 and 14 in series with the transistor 11 and the diodes 19 and 20 in series with the transistor 12, a voltage gain of at least two is insured when either of the transistors 11 and 12 is in the conductive state even though the current source 17 is supplying a very low current. This is because the impedance of each of the diodes 13 and 14 or 19 and 20 is the same as the impedance across the base-emitter junction of the transistor 11 or 12. Accordingly, the use of the pair of diodes in series insures that the transistor 11 or 12 remains conductive even when the low current source 17 produces a very low current.

The transistor 11 has a first emitter 21 connected to ground By a conductor 22, which has a resistor 23 therein. The transistor 12 has a first emitter 24 connected to the conductor 22 for connection to ground through the sources, 23. Accordingly, both of the transistors 11 and 12 of the storage cell 10 are connected to the same conductor 22. Each of the other storage cells in a particular row of the monolithic memory would similarly be connected to ground through the conductor 22 and the resistor 23. There is shown one other storage cell 25 in the same row as the cell 10 and connected to the conductor 22.

The transistor 11 has a second emitter 26 connected to a zero bit line 27. The transistor 12 has a second emitter 28 connected to a one bit line 29. The bit lines 27 and 29 are connected to a driver 30 through resistors 31 and 32, respectively. The driver 30 may be an NPN transistor having its emitter grounded and its collector connected to the resistors 31 and 32.

The bit lines 27 and 29 also are connected to all of the other storage cells, which are arranged in the same column as the storage cell 10. There is shown another cell 33 in the same column as the cell 10 and connected to the lines 27 and 29.

The cell 33 is connected to a low constant current source 34 or a high constant current source 35 through a switch 36 and a conductor 37. Thus, when the driver 30 is energized to change the potential on the lines 27 and 29, only one of the cells connected to the driver 30 will be energized at the same time depending on which of the cells in the column is connected to its high constant current source.

For example, if the switch 16 is engaged with the high constant current source 18, then the cell 10 is the one that will be read or have new information written therein since none of the other cells in the same column with the cell 10 can have its switch connected to its high constant current source at this time. That is, the switch 36 cannot be moved into engagement with the high constant current source 35 if the switch 16 is engaging the high constant current source 18 due to the decoding circuits.

When the cell 10 is connected to the low constant current source 17, there is very little current flow through the cell 10. As a result, the conductor 22 is substantially at ground since there is only a very small voltage drop across the resistor 23 when the cell 10 is connected to the low constant current source 17. Accordingly, when the cell 10 is connected to the low constant current source 17, the change of the potential on the lines 27 and 29 due to the driver 30 being energized will not cause any signal to be supplied or received by the transistors 11 and 12 from the lines 27 and 29. Thus, as long as any cell is connected to its low constant current source, the activation of the driver for its bit lines does not result in any reading of that particular cell or any writing of new information into that particular cell.

Whenever one of the cells in the column having the cell 10 is to be read or to have information stored therein, the driver 30 is energized to change the potential on the lines 27 and 29. When reading is to be accomplished, a switch 38 of the bit line 27 must be connected to a ground contact 39 and the bit line 29 must be connected by a switch 40 to a ground contact 41.

Thus, during reading, the specific cell in the column having the driver 30 connected to the bit lines 27 and 29 is connected to its high current source. If the cell 10 is assumed to be the one that is to be read, then the switch 16 is connected to the high current source 18.

When this occurs, current flows through the conducting transistor of the transistors 11 and 12 to cause a substantial voltage drop across the resistor 23. Accordingly, the potential on the conductor 22 rises from ground. This results in the current flowing through the conducting transistor to the line 27 or 29 connected thereto. Thus, if the transistor 12 is conducting, the rise in the potential on the line 22 causes the current to flow through the emitter 28 to the line 29. It should be understood that the driver 30 is connected to ground whereby the current flows through the line 29 and the driver 30 to produce a signal thereon. Thus, a sense amplifier (not shown), which is connected to the lines 27 and 29, would ascertain that the signal from the storage cell 10 indicates that the transistor 12 is conducting.

When it is desired to write new information in the storage cell 10, the driver 30 is again energized and one of the switches 38 and 40 is moved from its ground contact. Thus, if it is desired to write information into a cell through the zero bit line 27, then the switch 40 for the line 29 is connected to a contact 42, which is connected to a first positive voltage source, $+V$. If it is desired to write information into a cell through the one bit line 29, then the switch 38 of the line 27 is connected to a contact 43, which has a second positive voltage source, $+V$, connected thereto. It also is necessary to connect the switch 16 of the cell 10 to the high constant current source 18.

If it is desired to write information into the cell 10 through the line 27, then the switch 40 engages the positive voltage contact 42, and a diode 44 in the line 29 functions to keep the potential on the line 29 from dropping when the driver 30 is energized by clamping the line 29 at the positive potential of the contact 42. Thus, only the potential on the line 27 can fall. Likewise, a diode 45 in the line 27 serves to prevent the potential on the line 27 from dropping when it is desired to write by means of the one bit line 29. Of course, the switch 38 must be connected to the positive voltage contact 43 to clamp the line 27 at the positive potential.

If it is assumed that the transistor 12 is conducting and it is desired to turn on the transistor 11 by writing through the line 27 to change the bistable state of the cell 10, the switch 38 is connected to the ground contact 39 while the switch 40 is connected to the positive voltage contact 42. As a result, when the switch 16 is connected to the high current source 18, current flows through the transistor 12 to the emitter 24 whereby the voltage drop across the resistor 23 becomes rather large. This tends to make the emitter 24 positive with respect to the emitter 26 of the transistor 11 but not the emitter 28, which is held positive by the switch 40.

The base of the transistor 11 is initially a few hundred millivolts negative with respect to the base of the transistor 12 rendering the transistor 11 nonconductive. However, as the emitter 26 of the transistor 11 also becomes a few hundred millivolts negative with respect to the emitter 24 of the transistor 12, the transistor 11 begins to conduct.

The transistor 11 now rapidly discharges the base of the transistor 12 rendering it nonconductive. Thus, the transistor 11 is turned on and the transistor 12 is then turned off; the cell 10 now has new stored information.

If the transistor 11 had been conducting when the switch 38 was connected to the ground contact 39 and the switch 40 was connected to the positive voltage contact 42, the conditions of the transistors 11 and 12 would not have changed. That is, the transistor 11 would have remained conducting, and the transistor 12 would have remained in the nonconductive state.

When it is desired to read information from the cell 33, the driver 30 is still energized, and the switches 38 and 40 are still connected to the ground contacts 39 and 41. The only difference is that the switch 36 is connected to the high current source 35 rather than the switch 16 being connected to the high current source 18.

Likewise, if it is desired to write information into the cell 33, the switch 36 must be connected to the high current source 35. Of course, the same connections of the switches 38 and 40 are made as when writing in the cell 10 depending on which of the bit lines 27 and 29 is to write information into the cell.

As shown in FIG. 1, each of the columns of cells has its own driver. That is, the cell 25 is connected to a driver 46, which is like the driver 30 for the column of cells including the cells 10 and 33. The driver 46 is connected to the cell 25 through a zero bit line 47 and a one bit line 48; these correspond to the bit lines 27 and 29.

The line 47 has a switch 49 which cooperates with a ground contact 50 and a positive voltage contact 51. The positive voltage contact 51 is connected to the contact 43 since all of the zero bit lines for all of the columns of cells are connected to the same positive voltage source.

Similarly, the line 48 has a switch 52 connected thereto for cooperation with a ground contact 53 and a positive voltage contact 54, which is connected to the positive potential contact 42. All of the one bit lines for all of the columns of cells are connected to the same positive voltage source.

Therefore, if it is desired to read the information stored in the cell 25, the driver 46 must be energized rather than the driver 30. The switches 49 and 52 are in engagement with the ground contacts 50 and 53, respectively. The cell 25 receives its current from the high current source 18 through connecting the switch 16 thereto. The cell 10 is not activated at this time since the driver 30 is deenergized.

If it is desired to write, one of the switches 49 and 52 is moved into engagement with the positive voltage contacts 51 and 54, respectively, while the other remains in engagement with its ground contact. This results in writing new information in the cell 25, which is connected to the high current source 18 through the switch 16.

It should be understood that the switches for all the bit lines are connected to their positive voltage contacts when neither read nor write is occurring. Thus, for example, the switches 38 and 40 for the bit lines 27 and 29 engage the contacts 43 and 42, respectively.

Instead of utilizing the diodes 13 and 14 and the diodes 19 and 20 as load impedance means for the storage cell 10 when either the low current source 17 or the high current source 18 is connected thereto, a circuit may be arranged in which the diodes are only utilized during the time that a low current is being supplied to the transistors 11 and 12. This also would be applicable to all other cells in the memory.

Figure 2:
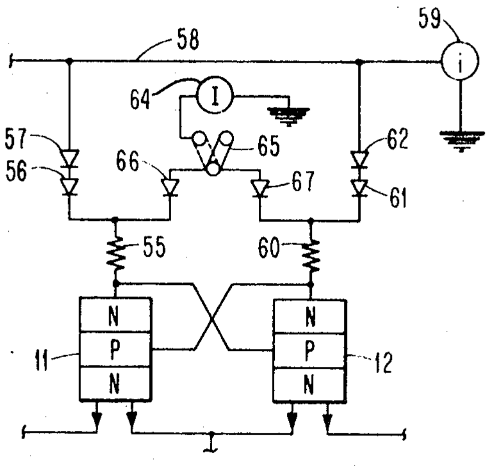

This arrangement is shown in FIG. 2 wherein the transistor 11 has its collector connected through a resistor 55 and a pair of diodes 56 and 57 to a conductor 58, which is connected to a low constant current source 59. The low current source 59 is similar to the low constant current source 17 of FIG. 1 and would be connected to all of the other storage cells in the same row as the cell 10.

The transistor 12 is connected through a resistor 60 and diodes 61 and 62 to the low current source 59. Accordingly, whenever the transistors 11 and 12 are connected only to the low current source 59, the cell 10 is in its inactive condition. Thus, the diodes 56 and 57 insure that the voltage gain of the transistor 11, if it is the conducting transistor in the cell, is at least two. Likewise, the diodes 61 and 62 insure that the transistor 12 has a voltage gain of at least two if it is conducting. Therefore, the conducting transistor of the transistors 11 and 12 remains in its conductive state whenever the transistors 11 and 12 are connected only to the low current source 59.

When it is desired to read or write, a high constant current source 64 is connected by a switch 65 to each of the transistors 11 and 12. The high current source 64, which also is connected to all of the other cells in the same row as the cell 10, is connected through a blocking diode 66 and the resistor 55 to the transistor 11 and through a blocking diode 67 and the resistor 60 to the transistor 12. At the magnitude of the current from the high current source 64, the diodes 66 and 67 have substantially no impedance so that all of the collector load impedance for each of the transistors 11 and 12 is in the resistors 55 and 60, respectively. Thus, this arrangement results in the nonlinear impedance, which is the diodes 56 and 57 for the transistor 11 and the diodes 61 and 62 for the transistor 12, being used only in the inactive condition of the transistors 11 and 12.

Figure 3:
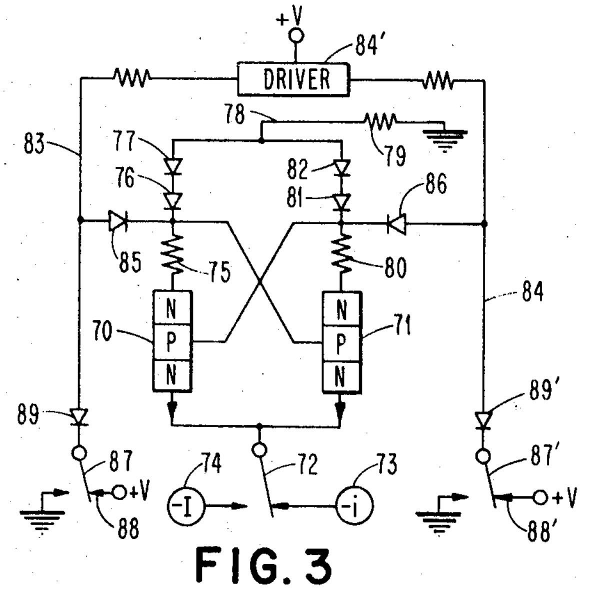

Referring to FIG. 3, there is shown another form of storage cell utilizing the nonlinear impedance of the present invention. The storage cell includes a pair of NPN transistors 70 and 71 with each having a single emitter, which is connected to a switch 72. The switch 72 is connected to either a low constant current source 73 or a high constant current source 74. Each of the current sources 73 and 74 produces a negative current.

The transistor 70 has its collector connected through a resistor 75 and diodes 76 and 77 to a conductor 78, which is connected to ground through a resistor 79. The transistor 71 has its collector connected to the conductor 78 through a resistor 80 and diodes 81 and 82. The diodes 76 and 77 form the nonlinear impedance means for the transistor 70 while the diodes 81 and 82 form the nonlinear impedance means for the transistor 71.

The transistors 70 and 71 are connected in a flip-flop arrangement. The base of the transistor 70 is connected to the collector of the transistor 71 through the resistor 80 while the base of the transistor 71 is connected to the collector of the transistor 70 through the resistor 75.

When the switch 72 is in engagement with the low current source 73, there is substantially no drop across the resistor 79. When it is desired to read the information stored in the cell, the switch 72 is moved into engagement with the high current source 74.

At the same time, bit lines 83 and 84, which correspond to the lines 27 and 29 of FIG. 1, have the potentials thereon raised due to a driver 84′, which may be an emitter follower, for example, being energized. The line 83 is connected through a diode 85 between the diode 76 and the collector resistor 75 while the line 84 is connected through a diode 86 between the diode 81 and the collector resistor 80.

In addition to energizing the driver 84′ to increase the potential on the lines 83 and 84, it is necessary for the lines 83 and 84 to be connected by switches 87 and 87′ to positive voltage contacts 88 and 88′ through diodes 89 and 89′ in the lines 83 and 84. This also is the position of the switches 87 and 87′ when the storage cell is in its inactive condition.

It should be understood that the potential on the contacts 88 and 88′ is much smaller than the potential supplied by the driver 84′. For example, the driver 84′ may supply 3 volts while the potential on each of the contacts 88 and 88′ would be about 400 millivolts.

Accordingly, if the transistor 70 is conducting, the potential on the conductor 78 drops due to the voltage drop across the resistor 79. The transistor 70, which is conducting, has a drop through its collector resistor 75 while the transistor 71 does not. As a result, the diode 85 conducts while the diode 86 does not conduct. Thus, the line 83 senses that the transistor 70 of the storage cell is conducting. This will indicate to a sense amplifier (not shown), which is connected to both of the bit lines 83 and 84, that the cell is in the state in which the transistor 70 is conducting.

When it is desired to write information into the storage cell, the switch 72 is again moved into contact with the high current source 74. At the same time, the driver 84' for the lines 83 and 84 is energized but one of the lines is clamped at a lower potential than the other line by connecting the switch of the line to be clamped to its ground contact.

If the transistor 70 is conducting and it is desired to change the bistable state of the cells so that the transistor 71 is conducting, the line 83 has its potential increased while the line 84 is clamped at the lower potential through connecting the switch 87' to its ground contact. Accordingly, current flows through the diode 85 to the base of the transistor 71 to increase the potential of the base of the transistor 71 with respect to the emitter.

By having the base of the transistor 71 connected to the collector of the transistor 70 through the resistor 75, the resistor 75 prevents too much of the current from flowing from the line 83 through the transistor 70. This enables a faster switching operation of the transistor 71 to its conducting state and the transistor 70 to its nonconducting state.

When the base of the transistor 71 becomes sufficiently positive with respect to its emitter to draw substantial current, the transistor 71 turns on. This results in the charge on the base of the transistor 70 discharging through the resistor 80 and the transistor 71. As a result, the transistor 70 turns off.

If the cell had been in the bistable state in which the transistor 70 was already conducting, the application of a higher potential on the line 83 and clamping the lower potential on the line 84 would not have changed the bistable state of the cell. That is, the transistor 71 would remain conducting, and the transistor 70 would remain nonconducting.

If it is desired to store information in the cell so that the transistor 70 is conducting, the line 84 is increased to a higher positive potential while the line 83 is clamped at the lower potential. This results in turning on the transistor 70 if it is not already turned on and turning off the transistor 71. Of Of course, if the transistor 70 is already on, the cell does not have its bistable state changed.

It should be understood that the memory has additional columns of storage cells whereby rows of cells are formed. Thus, each of the storage cells disposed in the same row having the transistors 70 and 71 would be connected through the switch 72 to one of the current sources 73 and 74. However, each of these cells would be connected to a different pair of zero and one bit lines than the bit lines 83 and 84 in the same manner as mentioned with respect to FIG. 1.

Figure 4:
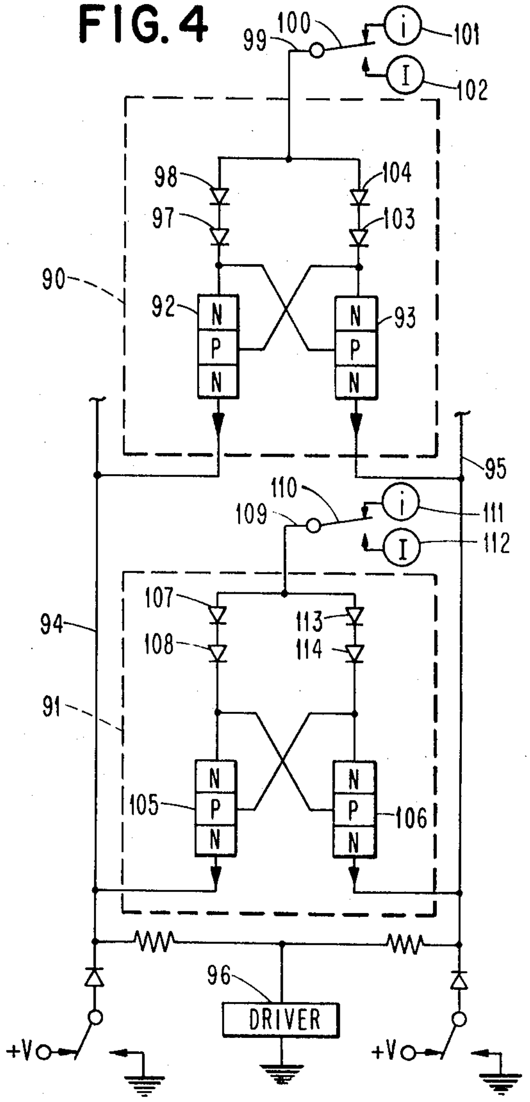

Referring to FIG. 4, there is shown another form of monolithic memory employing the nonlinear impedance means of the present invention. By utilizing the nonlinear impedance means of the present invention, each of the storage cells of the memory of FIG. 4 requires only a single emitter for each transistor. The memory takes advantage of the fact that the magnitude of the current when the high current source is applied to the storage cell may be many orders of magnitude larger than the current supplied to the storage cell during its inactive condition. This is possible when using the nonlinear impedance means of the present invention because the nonlinear impedance means maintains the desired voltage gain across the conducting transistor at very low current.

As shown in FIG. 4, a pair of storage cells 90 and 91 is arranged in a column. The storage cell 90 includes a pair of NPN transistors 92 and 93.

The transistor 92 has its emitter connected to a zero bit line 94, and the transistor 93 has its emitter connected to a one bit line 95. Each of the lines 94 and 95 is connected to a positive voltage source and ground in the same manner as is each of the lines 27 and 29 of FIG. 1. The lines 94 and 95 also are connected to a driver 96, which is similar to the driver 30.

The transistor 92 has its collector connected through a pair of series connected diodes 97 and 98, which are nonlinear impedance means functioning as the load impedance means for the transistor 92, to a conductor 99. The conductor 99 is connected by a switch 100 to a low constant current source 101 and a high constant current source 102. The magnitude of the current from the source 102 is many orders greater than the magnitude of the current from the source 101.

The transistor 93 has its collector connected through a pair of series connected diodes 103 and 104, which are nonlinear and function as the load impedance means for the transistor 93, to the conductor 99. Accordingly, both of the transistors 92 and 93 are simultaneously connected through the switch 100 to one of the two current sources.

The transistors 92 and 93 are connected in the flip-flop arrangement with the base of the transistor 92 connected to the collector of the transistor 93 and the base of the transistor 93 connected to the collector of the transistor 92. Thus, only one of the transistors 92 and 93 will be in the conducting state.

Each of the diodes 97 and 98 has the same impedance as the base-emitter junction of the transistor 92 irrespective of the collector current flowing therethrough. Likewise, each of the diodes 103 and 104 has the same impedance as the base-emitter junction of the transistor 93 irrespective of the collector current flowing therethrough. Thus, a voltage gain of two is provided for each of the transistors 92 and 93 when it is conducting irrespective of the collector current flowing therethrough.

The cell 91 has a pair of NPN transistors 105 and 106 connected to each other in the well-known flip-flop manner. The transistors 105 and 106 have their emitters connected to the bit lines 94 and 95, respectively.

The transistor 105 has its collector connected through a pair of diodes 107 and 108, which form the nonlinear load impedance means for the collector of the transistor 105, to a conductor 109. The conductor 109 is connected by a switch 110 to a low constant current source 111 and a high constant current source 112. The magnitude of the current from the source 112 is many orders of magnitude greater than the magnitude of the current from the source 111.

The transistor 106 is connected through a pair of diodes 113 and 114, which form the nonlinear load impedance means for the collector of the transistor 106, to the conductor 109. Accordingly, when the switch 110 is connected to the low constant current source 111, the cell 91 is in its inactive condition. When the switch 110 is connected to the high constant current source 112, the cell 91 is in its active condition.

It should be understood that the memory has additional columns of storage cells whereby rows of cells are formed. Thus, each of the storage cells disposed in the same row as the cell 90 would be connected to the conductor 99. However, each of these cells would be connected to a different pair of zero and one bit lines than the bit lines 94 and 95 in the same manner as mentioned with respect to FIG. 1.

Similarly, each of the storage cells in the row with the cell 91 would be connected to the conductor 109. In the same manner as described for FIG. 1, each of the cells in the same row would be connected to a different pair of zero and one bit lines with the pair of bit lines being connected to all of the cells in a particular column.

When it is desired to read the information stored in the cell 90, for example, the driver 96 is energized and the switch 100 is connected to the high constant current source 102. The bit lines 94 and 95 are connected through diodes to their ground contacts in the same manner as the lines 27 and 29.

Thus, with only the cell 90 connected to its high current source and all of the other cells in the same column connected to their low current sources, the sum of the currents flowing from the other storage cells in the same column as the cell 90 is many orders of magnitude less than the current flowing from the cell 90.

Therefore, if the transistor 92 is conducting, the current flowing therethrough from the high constant current source 102 results in the bit line 94 having a much larger current than the bit line 95. As a result, a sense amplifier (not shown), which is connected to the bit lines 94 and 95, senses that the signal from the storage cell 90 is on the bit line 94. Thus, the bistable state of the cell 90 is readily ascertained.

When it is desired to write information into the cell 90, the switch 100 again is connected to the high current source 102 and the driver 96 is activated. None of the other cells in the column with the cell 90 is connected to its high constant current source at this time.

Accordingly, because of the many orders of magnitude of difference between the current produced by the high constant current source and the current produced by the low constant current source, the time to switch the bistable state of the cell connected to the high constant current source is much smaller than the time to switch the bistable state of any of the cells connected to the low constant current source. Therefore, by utilizing a relatively short pulse period in comparison with the duty cycle of the driver 96, only the cell, which is connected to the high constant current source, can switch when one of the bit lines 94 and 95 has a pulse thereon to cause writing. By making the duty cycle of the driver 96 relatively long in comparison with the pulse, none of the storage cells, which are connected to the low constant current sources, can be switched due to the closeness of two separate pulses, for example, on one of the bit lines.

If it is desired to write into the cell 90 so that the transistor 92 becomes conductive and the transistor 93 is now conducting, the bit line 95 is connected to its positive voltage contact while the bit line 94 remains connected to its ground contact. As a result, the emitter of the transistor 93 becomes positive with respect to its base whereby the transistor 93 is unable to conduct so that its collector voltage increases. At the same time, the decrease of the potential on the line 94 due to the driver 96 being energized causes the emitter of the transistor 92 to become more negative with respect to the base of the transistor whereby current starts to flow through the transistor 92.

As the current starts to flow through the transistor 92, the collector potential of the transistor 92 begins to drop whereby the base of the transistor 93 becomes more negative with respect to the emitter, which has been made more positive due to the line 95 being connected to its positive voltage contact. Thus, the transistor 92 is turned on while the transistor 93 is turned off, and the cell 90 now has new information stored therein.

If the transistor 92 had been conducting when the line 95 was connected to its positive voltage contact while the line 94 remained connected to its ground contact, the condition of the transistors 92 and 93 would not have changed. That is, the transistor 92 would have remained conducting, and the transistor 93 would have remained in a nonconducting state.

Because the current from the low constant current source 111 is many orders of magnitude less than the current from the high constant current source 112, there is not sufficient time for the cell 91 to switch its bistable state if the driver 96 is energized for only a short period of time in comparison with the time that it is deenergized. The driver 96 must not be energized so close to its previous energization that the cell 91 would be able to switch its bistable state due to the sum of the two periods during which the driver 96 is activated. This also is applicable to any other storage cells in the same column as the cell 90.

Figure 5:
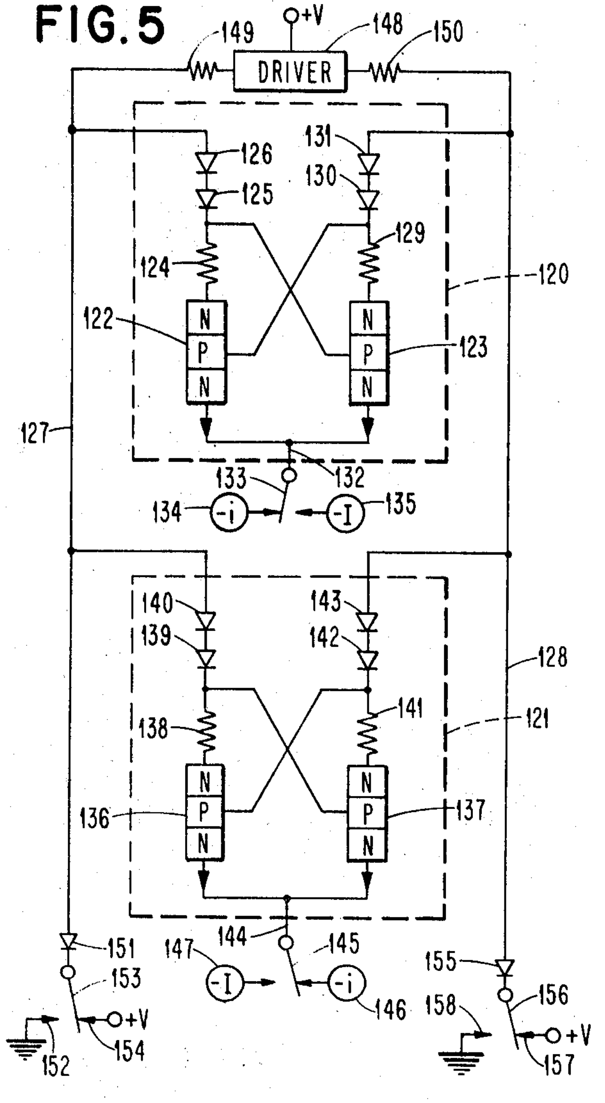

Referring to FIG. 5, there is shown another memory in which the nonlinear impedance means of the present invention is employed. The memory of FIG. 5 is the negative arrangement of the memory of FIG. 4.

As shown in FIG. 5, a pair of storage cells 120 and 121 is arranged in a column. The storage cell 120 includes a pair of NPN transistors 122 and 123.

The collector of the transistors 122 is collected through a resistor 124 and a pair of diodes 125 and 126, which form the nonlinear load impedance means for the transistor 122, to a zero bit line 127. The transistor 123 has its collector connected to a one bit line 128 through a resistor 129 and a pair of diodes 130 and 131, which form the nonlinear load impedance means for the transistor 123.

The emitters of the transistors 122 and 123 are connected to a conductor 132, which is connected by a switch 133 to either a low constant current source 134 or a high constant current source 135. Both the low current source 134 and the high current source 135 are negative. The high current source 135 is many orders of magnitude larger than the low current source 134.

The transistors 122 and 123 are connected in a flip-flop arrangement. The base of the transistor 122 is connected to the collector of the transistor 123 through the resistor 129 while the base of the transistor 123 is connected to the collector of the transistor 122 through the resistor 124.

The storage cell 121 includes a pair of NPN transistors 136 and 137. The collector of the transistor 136 is connected to the zero bit line 127 through a resistor 138 and a pair of diodes 139 and 140, which form the nonlinear impedance means for the transistor 136. The transistor 137 is connected to the one bit line 128 by a resistor 141 and a pair of diodes 142 and 143, which form the nonlinear load impedance means for the transistor 137.

The emitters of the transistors 136 and 137 are connected to a conductor 144, which is connected by a switch 145 to either a low constant current source 146 or a high constant current source 147. The current sources 146 and 147 are negative with the high constant current source 147 being many orders of magnitude larger than the low constant current source 146 in the same manner as the current sources 135 and 134 are related to each other.

The transistors 136 and 137 are connected in a flip-flop arrangement. The base of the transistor 136 is connected to the collector of the transistor 137 through the resistor 141 while the base of the transistor 137 is connected to the collector of the transistor 136 through the resistor 138.

While only one column of the storage cells of the memory of FIG. 5 has been shown, it should be understood that other columns of the cells would be employed to form rows of the cells with the cells 120 and 121 and other cells in the column with the cells 120 and 121. Each of the other columns of the cells would have its own pair of zero and one bit lines in the same manner as is shown in FIG. 1. Each of the cells in each of the other columns would be connected to the current sources in the same row. That is, all of the other cells in the same row as the cell 120 would be connected to the conductor 132 for connection to one of the current sources 134 and 135.

The zero bit line 127 is connected to a driver 148 through a resistor 149. The one bit line 128 is connected to the driver 148 through a resistor 150. The driver 148 may be an emitter follower, for example, having its emitter connected to the resistors 149 and 150.

When it is desired to read the information stored in the cell 120, for example, the switch 133 is moved from engagement with the low current source 134 and into contact with the high current source 135. When this occurs, current, which is many orders of magnitude larger than the sum of currents from all of the other cells in the column connected to their low constant current sources, flows through the conducting transistor of the cell 120. For example, if the transistor 123 is conducting, then there is a large voltage drop across the resistor 150 due to the current flowing through the transistor 123. The sum of all of the other currents, as previously mentioned, will not cause any significant voltage drop across the resistor 149 or any additional significant voltage drop across the resistor 150. Accordingly, a sense amplifier (not shown), which is connected across the lines 127 and 128, senses the large voltage drop across the resistor 150 to indicate that the cell 120 is in the bistable state in which the transistor 123 is conducting.

When it is desired to write new information into the cell 120, the switch 133 is again connected with the high constant current source 135. If the transistor 123 is assumed to be conducting and it is desired to have the cell 120 indicate that the transistor 122 is conducting, it is necessary to turn off the transistor 123 and turn on the transistor 122.

Accordingly, to write this information into the cell 120, the bit line 127 is connected through a diode 151 to its ground contact 152 by a switch 153. During read, the switch 153 connects the line 127 to a contact 154, which is connected to a positive voltage source, +V.

During the writing in which the transistor 122 is to be made conductive, the one bit line 128 remains connected through its diode 155 and a switch 156 to its positive voltage contact 157. The switch 156 is moved into engagement with a contact 158, which is connected to ground, only when the transistor 123 or one of the other transistors, which is connected to the bit line 128, is to be made conductive.

Therefore, to cause the transistor 122 to be conductive, the current drop across the resistor 149 due to the driver 148 being energized decreases the potential on the collector of the transistor 122 with respect to the potential on the collector of the transistor 123. Since the base of the transistor 122 is connected between the resistor 129 and the diode 130, the base of the transistor 122 becomes positive with respect to its emitter to cause the transistor 122 to turn on. When this occurs, the transistor 123 will turn off.

The resistor 129 serves to insure that there will be a sufficient potential at the base of the transistor 122 when it is desired to turn on the transistor 122. The resistor 129 provides a sufficient voltage drop irrespective of the charge on the base of the transistor 123.

Referring to FIG. 6, there is shown another form of a monolithic memory utilizing the nonlinear impedance means of the present invention. A single storage cell 160 is shown in FIG. 6 with the cell 160 having a pair of NPN transistors 161 and 162 connected to each other in a flip-flop arrangement whereby the base of one is connected to the collector of the other and vice versa. The transistors 161 and 162 have their emitters grounded.

The transistor 161 has its collector connected through a pair of series connected diodes 163 and 164, which are the nonlinear load impedance means for the transistor 161, to a conductor 165. The conductor 165 is connected by a switch 166 to a low constant current source 167 and a high constant source 168. The magnitude of the current from the high current source 168 is many orders greater than the magnitude of the current from the low current source 167.

The transistor 162 has its collector connected through a pair of series connected diodes 169 and 170, which form the nonlinear load impedance means for the transistor 162, to the conductor 165. Accordingly, both of the transistors 161 and 162 are simultaneously connected by the switch 166 to one of the two current sources 167 and 168.

The base of the transistor 161 is connected to the base of an NPN transistor 171, which has its collector connected through a diode 172 to a zero bit line 173. The emitter of the transistor 171 is connected to the collector of an NPN transistor 174.

The transistor 174 has its base connected by a switch 175 to either a contact 176, which is connected to a positive voltage source, +V, or a contact 177, which is grounded. The transistor 174 has its emitter connected to a contact 178, which is grounded, or a contact 179, which is connected to a positive voltage source, +V, by a switch 180.

The transistor 162 has its base connected to the base of an NPN transistor 181. The collector of the transistor 181 is connected through a diode 182 to a one bit line 183. The emitter of the transistor 181 also is connected to the collector of the transistor 174.

The bit line 173 has one end connected through a resistor 184 to ground and through a resistor 185, which has the same resistance as the resistor 185, which has the same resistance as the resistor 184, to a positive voltage source, +V. An NPN transistor 186 has its collector connected to the bit line 173 above the connection of the resistors 184 and 185. The transistor 186 has its emitter grounded so that the transistor 186 is in parallel with the resistor 184. The resistors 184 and 185 and the transistor 186 comprise the driver for the bit line 173.

The bit line 183 has one end connected through a resistor 187 to ground and through a resistor 188, which has the same resistance as the resistor 187, to a positive voltage source, +V. An NPN transistor 189 has its collector connected to the bit line 183 above the connection of the resistors 187 and 188. The transistor 189 has its emitter grounded so that the transistor 189 is connected in parallel with the resistor 187. The resistors 187 and 188 along with the transistor 189 comprise the driver for the bit line 183.

Whenever the storage cell 160 is in its inactive or standby storage condition, the switch 166 engages the low constant current source 167, the switch 175 engages the ground contact 177, and the switch 180 engages the positive voltage contact 179. Thus, the transistor 174 is turned off.

At this time, the transistors 186 and 189 are turned off whereby there is a potential on each of the bit lines 173 and 183. This potential on each of the bit lines is one half of the magnitude of the voltage source, +V. However, because the transistor 173 is not conducting, no current flows through the transistors 171 and 181.

When it is desired to read the information stored in the storage cell 160, the switch 175 is connected to the positive voltage contact 176, and the switch 180 is connected to the ground contact 178. This allows current to flow through the transistor 174. The switch 166 connects the conductor 165 with the high current source 168 whereby the cell 160 is in its active condition.

Each of the bit lines 173 and 183 has the positive potential of one half the voltage source, +V, placed thereon by the driver. If the transistor 161 is assumed to be conducting and the transistor 162 is not conducting, the base of the transistor 161 has a high potential, which is transmitted to the base of the transistor 171. This allows the transistor 171 to conduct since there is a positive potential on the line 173 and the transistor 174 is conducting. At the same time, the transistor 181 will not conduct because its base is negative with respect to the base of the transistor 171.

A sense amplifier (not shown), which is connected to the bit lines 173 and 183, senses the current flow from the bit line 173 through the transistor 171 by sensing the difference in the voltage drop across the resistors 185 and 188. The sense amplifier provides a signal to indicate that the bistable state of the storage cell 160 is such that the transistor 161 is conducting.

If the transistor 162 has been conducting rather than the transistor 161, then the transistor 181 would have been conductive while the transistor 171 would have been nonconductive. The current flow would then have been from the bit line 183 through the transistor 181 and the transistor 174.

It should be understood that there are a plurality of storage cells arranged in the same column as the cell 160 and a plurality of cells in the same row as the cell 160. Each of the other cells in the same column as the cell 160 has a plurality of cells in the same row. This is the same type of matrix of columns and rows as described in FIG. 1.

When it is desired to write information into the cell 160 and it is assumed that it is desired to have the transistor 162 conducting whereas the transistor 161 has been conducting, the bit line 173 has a potential thereon that is negative with respect to the potential on the bit line 183. This is accomplished by turning on the transistor 186 to connect the bit line 173 to ground while the bit line 183 remains at a higher potential since it is still receiving one half of the voltage from its voltage source, +V.

Even though the transistor 174 is connected so that its emitter is connected to ground and its base is connected to the positive voltage contact 176 by the switch 175, current ceases to flow from the bit line 173 through the transistor 171 due to the bit line 173 being at ground. As a result, no current flows through the collector of the transistor 171.

However, current still flows through the base-emitter junction of the transistor 171 due to the transistor 174 being conductive. This current is supplied to the base of the transistor 171 from the transistor 161 whereby the potential of the base of the transistor 161 drops. When this occurs, the transistor 161 ceases to be conductive.

When the transistor 161 ceases to be conductive, its collector potential increases whereby the potential of the base of the transistor 162 increases with respect to its grounded emitter to turn on the transistor 162. At about the same time, the transistor 181, which has its base connected to the base of the transistor 162, also turns on. Current flows through the transistor 181 to the transistor 174 from the bit line 183 because the bit line 183 is connected to its positive voltage source, $+V$, through the resistor 188.

Accordingly, reducing the potential on the line 173 with respect to the potential on the line 183 results in turning on the transistor 162 and turning off the transistor 161 of the cell 160. Of course, if the cell 162 had been conducting when the new write information was supplied, it would have remained in its conductive state because of the positive potential on the bit line 183 with respect to the potential on the bit line 173.

Referring to FIG. 7, there is shown a curve illustrating the relationship of the voltage and current between the terminals of a storage cell. When the cell is in the inactive or standby storage condition whereby there is neither reading nor writing, the voltage across the terminals will be approximately 1.3 volts; this is indicated at point 190. If this curve is considered to represent voltage across the cell 10 of the embodiment of FIG. 1, for example, the switch 16 will be connected to the low constant current source 17 and the bit lines 27 and 29 will be connected to the positive voltage contacts 43 and 42, respectively. This produces both a low voltage and a low current.

When the cell 10 is to be read, the switch 16 is moved into engagement with the high constant current source 18 and the switches 38 and 40 are moved into engagement with the ground contacts 39 and 41, respectively. This increases the voltage across the cell 10 to about 2.6 volts, and the current increases exponentially due to the nonlinear load impedance of the diodes. This is indicated at point 191 in FIG. 7.

For all of the cells in the same row as the cell 10, their bit lines will be connected to their positive voltage contacts. As a result, their voltage will be less than the operating level of approximately 2.6 volts such as about 2.2 volts, for example, whereby the current is substantially less. Thus, the power applied to each of the cells in the same row as the cell 10 will be less than half the power applied to the cell 10 due to the nonlinear load impedance of the diodes. This relation is indicated at point 192 in FIG. 7.

For all of the cells in the same column as the cell 10, these cells have their bit lines connected to ground. However, each of these cells is connected to its low constant current source whereby it has a power level indicated by the point 190.

When it is desired to write new information into the cell 10, one of the switches 38 and 40 is moved into engagement with its positive voltage contact but the other switch is engaged with its ground contact. Thus, when the cell 10 is connected to the high constant current source 18 with one of the switches 38 and 40 connected to its ground contact, the full operating power again occurs across the cell 10.

None of the cells in the same row as the cell 10 will have full operating power applied thereto even though they are connected to the high constant current source 18. This is because the bit lines for each of the cells in the same row as the cell 10 will be connected to their positive voltage contacts. Likewise, none of the cells in the same column as the cell 10 will have full operating power applied thereto even though one of their bit lines is connected to ground. This is because all of the other cells in the same column as the cell 10 will be connected to their low constant current sources.

Accordingly, the present invention utilizes a storage cell in which the power consumption during read or write by any of the other cells except the selected cell is less than half of the power of the selected cell. This produces a substantial reduction in the total power consumption by a memory utilizing the nonlinear impedance means of the present invention.

It should be understood that all of the embodiments of FIGS. 2—6 utilizing the nonlinear impedance means of the present invention also have the same power reducing feature as the embodiment of FIG. 1. That is, all of the cells except the selected cell utilize less than half of the power of the selected cell when the selected cell is in its high power level for read or write.

While the present invention has described the nonlinear load impedance means as being utilized with monolithic memory devices, it should be understood that the nonlinear impedance means could be utilized with any memory device employing flip-flop cells. It is not necessary that the memory be monolithic.

While the present invention has described the nonlinear impedance means as being employed with storage cells, it should be understood that the nonlinear impedance means may be employed to permit a much lower level of power to be supplied to any type of circuit in which at least one transistor is conducting and at least one other transistor, which is connected thereto, is not conducting and the state of each transistor depends upon the state of a transistor connected thereto. For example, a logic circuit could be employed with a plurality of transistors, and each of the transistors connected in parallel to the same voltage source through the nonlinear impedance means of the present invention. The transistors could be arranged so that the collector of each transistor is connected to the base of the next adjacent transistor.

Accordingly, if a first transistor were conducting and its collector was connected to the base of the next adjacent transistor, the next adjacent transistor would not be able to conduct. Similarly, if the nonconducting transistor had its collector connected to the base of a third transistor, for example, the third transistor would be able to conduct.

By utilizing the nonimpedance means of the present invention, sufficient current could be supplied to the transistors whenever is was desired to operate the transistors at relatively low switching speeds. This is because the nonlinear impedance means of the present invention would prevent the states of the transistors from being changed due to the voltage gain of any conducting transistor becoming less than one unless a signal were supplied to change the states of all the transistors.

This arrangement would permit the transistors, which form a logic circuit, for example, to continue to operate at relatively low power for a relatively long period of time. During this time, the operating time of the logic would be relatively slow because of the low power. However, it would still function.

Then, if it were desired to operate the logic circuit at high speed for a very few minutes, full power could be applied to the transistors to enable the transistors to operate at relatively fast switching speeds. Thus, this could be utilized on a satellite computer, for example, in which the computer would operate at full power only when the satellite was adjacent a celestial body. The power package could be substantially reduced in this manner.

While the present invention has described the nonlinear impedance means as being diodes, it should be understood that any suitable impedance means, which increases its impedance nonlinearly with a decrease in current flow may be employed. For example, an insulated field effect transistor of the source follower type could be employed.

An advantage of this invention is that it insures that a flip-flop storage cell does not lose its selected bistable state even at a relatively low standby current. Another advantage of this invention is that it permits relatively low currents to be employed to maintain transistors in selected bistable states. A further advantage of this invention is that it reduces the standby power consumption of flip-flop storage cells.

While the invention has been particularly shown and described with reference to preferred embodiments thereof, it will be understood by those skilled in the art that the foregoing and other changes in form and details may be made therein without departing from the spirit and scope of the invention.

We claim:

1. In combination:

at least two transistors connected to each other in such a manner that the conducting and nonconducting state of each transistor is related to the conducting and nonconducting state of the other transistor with at least one of the transistors being in a conducting state;

a low power level source;

a high power level source;

load impedance means for each of said transistors; means to connect each of said transistors through said load impedance means to one of said low power level source and said high power level source;

each of said load impedance means including nonlinear impedance means, said nonlinear impedance means being effective at least when said transistors are connected to said low power level source;

and said nonlinear impedance means having its impedance variable with the current flow therethrough to maintain the ratio of said load impedance means of each of said transistors that is conducting to its base-emitter impedance greater than one to maintain each of said conducting transistors in its conducting state when said transistors are connected to said low power level source.

2. The combination according to claim 1 in which said load impedance means includes said nonlinear impedance means when said transistors are connected to said high power level source.

3. The combination according to claim 1 in which:

each of said impedance means includes a resistor;

means to connect said resistor directly to said high power level source;

and means to connect said resistor to said low power level source through said nonlinear impedance means.

4. The combination according to claim 1 in which said transistors comprise two transistors connected in a flip-flop arrangement.

5. The combination according to claim 1 in which said nonlinear impedance means includes at least one diode.

6. The combination according to claim 1 in which said nonlinear impedance means includes two diodes connected in series.

7. The combination according to claim 1 in which said transistors are formed in a monolithic integrated semiconductor array.

8. A memory device including:

a plurality of storage cells;

a first plurality of power sources;

a second plurality of power sources;

each of said cells being connected to one of said first plurality of power sources and one of said second plurality of power sources so that no cell is connected to the same of said first plurality of power sources and said second plurality of power sources whereby only one of said cells may be activated due to one of said first plurality of power sources and one of said second plurality of power sources being simultaneously activated;

and each of said cells including nonlinear impedance means between its connection to one of said first plurality of power sources and its connection to one of said second plurality of power sources, said nonlinear impedance means reducing the power consumption of all other cells in the memory device to less than half the power consumption of said cell that has said one of said first plurality of power sources and said one of said second plurality of power sources connected thereto.

9. The memory device according to claim 8 in which said cells are formed in a monolithic integrated semiconductor array.

10. The memory device according to claim 8 in which:

said cells are arranged in columns and rows;

each of said columns of said cells being connected to a different one of said first plurality of power sources;

and each of said rows of said cells being connected to a different one of said second plurality of power sources.

11. The memory device according to claim 8 in which said nonlinear impedance means includes at least one diode.

12. The memory device according to claim 8 in which said nonlinear impedance means includes two diodes connected in series.

13. The memory device according to claim 8 in which:

each of said cells comprises two transistors connected in a flip-flop arrangement;

and each of said transistors being connected to one of said first and second plurality of power sources through said nonlinear impedance means.

14. The combination according to claim 2 in which said transistors comprise two transistors connected in a flip-flop arrangement.

15. The combination according to claim 14 in which said nonlinear impedance means includes at least one diode.

16. The combination according to claim 15 in which said transistors are formed in a monolithic integrated semiconductor array.

17. The combination according to claim 14 in which said nonlinear impedance means includes two diodes connected in series.

18. The combination according to claim 17 in which said transistors are formed in a monolithic integrated semiconductor array.

19. The combination according to claim 2 in which said nonlinear impedance means includes at least one diode.

20. The combination according to claim 2 in which said nonlinear impedance means includes two diodes connected in series.

21. The combination according to claim 4 in which said nonlinear impedance means includes at least one diode.

22. The combination according to claim 21 in which said transistors are formed in a monolithic integrated semiconductor array.

23. The combination according to claim 4 in which said nonlinear impedance means includes two diodes connected in series.

24. The combination according to claim 23 in which said transistors are formed in a monolithic integrated semiconductor array.

25. The memory device according to claim 9 in which:

said cells are arranged in columns and rows;

each of said columns of said cells being connected to a different one of said first plurality of power sources;

and each of said rows of said cells being connected to a different one of said second plurality of power sources.

26. The memory device according to claim 25 in which said nonlinear impedance means includes at least one diode.

27. The memory device according to claim 25 in which said nonlinear impedance means includes two diodes connected in series.

28. The memory device according to claim 25 in which:

each of said cells comprises two transistors connected in a flip-flop arrangement;

and each of said transistors being connected to one of said first and second plurality of power sources through said nonlinear impedance means.

29. The memory device according to claim 9 in which said nonlinear impedance means includes at least one diode.

30. The memory device according to claim 9 in which said nonlinear impedance means includes two diodes connected in series.

31. The memory device according to claim 9 in which:

each of said cells comprises two transistors connected in a flip-flop arrangement;

and each of said transistors being connected to one of said first and second plurality of power sources through said nonlinear impedance means.

32. The memory device according to claim 10 in which said nonlinear impedance means includes at least one diode.

33. The memory device according to claim 10 in which said nonlinear impedance means includes two diodes connected in series.

34. The memory device according to claim 10 in which:

each of said cells comprises two transistors connected in a flip-flop arrangement;

and each of said transistors being connected to one of said first and second plurality of power sources through said nonlinear impedance means.

35. The memory device according to claim 11 in which:

each of said cells comprises two transistors connected in a flip-flop arrangement;

and each of said transistors being connected to one of said first and second plurality of power sources through said nonlinear impedance means.

36. The memory device according to claim 12 in which:

each of said cells comprises two transistors connected in a flip-flop arrangement;

and each of said transistors being connected to one of said first and second plurality of power sources through said nonlinear impedance means.